United States Patent
Sehmer et al.

(10) Patent No.: US 10,546,161 B2
(45) Date of Patent: *Jan. 28, 2020

(54) RADIO FREQUENCY IDENTIFICATION TRAY SYSTEMS AND METHODS

(71) Applicant: PROMEGA CORPORATION, Madison, WI (US)

(72) Inventors: Mark Sehmer, Stoughton, WI (US); John Kuehl, McFarland, WI (US)

(73) Assignee: PROMEGA CORPORATION, Madison, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/985,267

(22) Filed: May 21, 2018

(65) Prior Publication Data

US 2019/0130139 A1  May 2, 2019

Related U.S. Application Data

(63) Continuation of application No. 15/268,756, filed on Sep. 19, 2016, now Pat. No. 9,977,928.

(51) Int. Cl.
| | |
|---|---|
| *G06K 7/08* | (2006.01) |
| *G06K 7/10* | (2006.01) |
| *G06Q 10/08* | (2012.01) |
| *H04L 29/08* | (2006.01) |

(52) U.S. Cl.
CPC ..... *G06K 7/10009* (2013.01); *G06K 7/10821* (2013.01); *G06Q 10/087* (2013.01); *H04L 67/10* (2013.01)

(58) Field of Classification Search
CPC ........... G06K 7/10009; G06K 7/10821; G06Q 10/087; G06Q 10/08; G06F 3/1454; H04L 67/10
USPC ................................................. 235/451, 385
See application file for complete search history.

(56) References Cited

U.S. PATENT DOCUMENTS

2017/0098049 A1    4/2017  Sweeney

OTHER PUBLICATIONS

Identix rPad, UHF RFID desktop reader with integrated antenna, http://www.idntx.com/rpad.html, printed on Dec. 19, 2016 (2 pages).
EM Microelectronic ; RFID Solution Tracks 100,000 Individual Documents, http://www.rfidjournal.com/articles/view?6869, Nov. 28, 2007 (2 pages).
PCT, Notification of Transmittal of the International Search Report and the Written Opinion of the International Searching Authority, or the Declaration, in Application No. PCT/US17/38941, dated Aug. 1, 2017 (8 pages).

*Primary Examiner* — Karl D Frech
(74) *Attorney, Agent, or Firm* — McAndrews, Held & Malloy, Ltd.

(57) ABSTRACT

A radio frequency identification (RFID) tray for use with a cloud application platform is described. A cloud application, operatively coupled to the RFID tray via the cloud application platform, issues a command to the RFID tray. The issued command is received by an embedded agent of the RFID tray. Based on the received command, the RFID tray performs an RFID scan of one or more RFID-tagged items placed on or in the RFID tray, and the embedded agent sends the tag information from the one or more RFID-tagged items to a cloud application of the cloud network that tracks an inventory of the RFID-tagged items.

1 Claim, 3 Drawing Sheets

RADIO FREQUENCY IDENTIFICATION TRAY SYSTEMS AND METHODS

CROSS-REFERENCE TO RELATED APPLICATIONS

The present application is a continuation of U.S. patent application Ser. No. 15/268,756, filed Sep. 19, 2016, which is hereby incorporated herein by reference, in its entirety.

BACKGROUND

Managing and tracking inventory in one or more locations, for example, can be time intensive and expensive.

In its simplest form, managing and tracking inventory is a manual task that requires manually entering data into a computer or manually handwriting entries on paper. Manual entries can suffer from inaccuracies and can be inconvenient if the manual entries need to be performed during a procedure or an experiment.

The use of bar codes and bar code readers can eliminate some of the manual aspects of data entry. However, it still can be inconvenient to hold a bar code reader and look for the bar code on an item for scanning, especially during a procedure or an experiment. Further, bar code readers are typically attached to a local computer that is part of a local network that also includes a local server. The local computers for each bar code reader and the local server can be substantial infrastructure expenses. Such infrastructure expenses can increase, especially when tracking and managing are required at more than one location. For example, each location would require its own network infrastructure including its own local computers and local server to manage the local bar code reader network at the respective location (e.g., a hospital, a laboratory, etc.). Hardware and software upgrades in the local computers, the local network, and/or the local server would have to be implemented at each location, effectively multiplying the costs and time expended.

BRIEF SUMMARY

Radio frequency identification (RFID) tray systems and methods are provided, substantially as illustrated by and/or described in connection with at least one of the figures, as set forth more completely in the claims.

DETAILED DESCRIPTION

Figure 1:
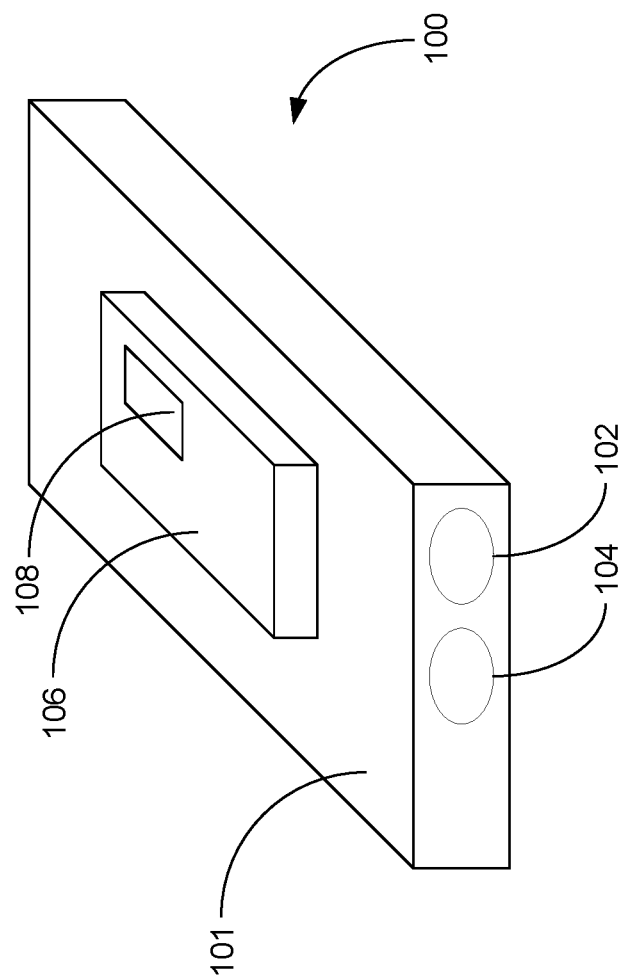
FIG. 1 shows an embodiment of a radio frequency identification (RFID) tray according to the present disclosure.

Some embodiments of the present disclosure relate to a radio frequency identification (RFID) tray system for use with a cloud application platform.

The cloud application platform (e.g., cloud system, cloud services, cloud platform, etc.) employed in some embodiments of the present disclosure provides numerous advantages and benefits over using local infrastructure that requires a local server at each location, for example. For example, the cloud application platform takes advantage of economies of scale. In a multi-tenant cloud system, services can be offered at lower prices by pooling resources across cloud infrastructure. In addition, local infrastructure tends to have a finite amount of capacity, while cloud application platforms can be designed to scale automatically and quickly to accommodate a larger scale.

The cloud application platform used in some embodiments of the present disclosure can reduce other costs such as front-end costs, for example. Using a pay-as-you-go model of a cloud application platform instead of the large upfront capital investment in local infrastructure, costs are commensurate with use. Accordingly, costs can be reduced, for example, by simply reducing services. In addition, maintenance time and expense are reduced. Local infrastructure such as local computers, local networks, and/or the local servers requires local staff to maintain and upgrade. In a cloud application platform, the cloud service provider takes care of maintenance and upgrades and typically with respect to the pooled resources such as cloud servers, thereby reducing overall staff, expense, and time. Moreover, instead of upgrading local servers at different locations which can be implemented unevenly (e.g., different upgrade versions in different locations), a cloud service provider can upgrade the cloud application platform to the latest version for all users.

The cloud application platform used in some embodiments of the present disclosure provide other advantages such as enhanced security. Cloud services are more secure than using local infrastructure which requires local staff to control and maintain. This is especially true in view of the economies of scale and the hosting of the cloud application platform on the Internet. Further, the cloud application platform is available to any location that has an Internet connection or can connect to the Internet. In comparison, local infrastructure requires devices and personnel in order to have access to the local networks and the Internet.

The cloud application platform used in some embodiments of the present disclosure provide other advantages such as sustainability. Since the cloud application platform is capable of pooling cloud service capacity, the cloud application platform is more environmentally friendly than local infrastructure which is designed to accommodate unused capacity (e.g., wasted capacity) for possible future growth. By using the cloud application platform instead of individual local computers and servers, the cloud application platform uses more efficiently resource and service capacity.

Some embodiments of the present disclosure provide an autonomous, discrete cloud-connected device for tracking and/or managing RFID-tagged items or batches of items.

Some of the problems in conventional item managing and tracking can be overcome by one or more embodiments of the present disclosure that provide discrete cloud-connected devices such as, for example, RFID trays that connect to a cloud that hosts cloud applications and/or RFID trays that connect to other applications (e.g., local or remote applications that are part of or external to the cloud) via the cloud.

Some embodiments of the present disclosure provide cloud-connected RFID trays and RFID-tagged items (e.g., inventory, samples, documents, vials, etc.) that are tracked by cloud applications or other applications that are not necessarily cloud-based, but might use the cloud to link with the RFID trays and RFID-tagged items. The RFID-tagged items are placed on or near the RFID tray to trigger an RFID scan before or during a hospital procedure or a laboratory experiment, for example. In some embodiments, a button or other input is actuated to cause the RFID tray to perform the RFID scan. The information contained in the RFID tag is sent to the cloud for processing (e.g., tracking, managing, ordering, etc.)

Some embodiments of the present disclosure provide that, after the cloud-connected RFID tray is triggered by a button or automatically triggered by proximity to the RFID tray or some non-user initiated method, the cloud application is notified and causes the RFID tray to perform particular automated processes including, for example, RFID scanning the RFID-tagged item or batch of items. In some embodiments, instead of a cloud application, an application that is external to, but connected to the RFID tray via the cloud, is used.

In some embodiments, a scan performed by the RFID tray can be initiated by the cloud application platform, cloud applications, and/or applications that are not part of the cloud, but can be connected to the cloud. For example, the scan performed by the RFID tray can be initiated by a mobile phone in communication with the cloud application platform in order to collect inventory information. In another example, the cloud application platform can cause the scan to be performed periodically by the RFID tray. Scan initiations can be performed according to a schedule or a timed event on the RFID tray, the cloud application platform, and/or another device (e.g., a mobile phone, tablet, laptop, computer, etc.)

Some embodiments of the present disclosure provide that the cloud-connected RFID tray can provide point-of-use inventory tracking. For example, the cloud-connected RFID tray can be used to track the use of inventory or samples during a healthcare procedure or a lab experiment, for example, in which the user physically places the RFID-tagged item or packaging on the RFID tray for RFID scanning before, after, or during use of the inventory or sample. In some embodiments, the RFID tray can be placed in a local stock room on which an RFID-tagged card (e.g., a Kanban card), a plastic bin, label, or document can be placed on the RFID Tray when inventory falls below a particular level. In some embodiments, the inventory can reside on the tray and be monitored at all times, for example.

Some embodiments of the present disclosure provide that the use of cloud-connected RFID trays can eliminate or reduce the need for someone to manually enter data or to manually scan barcodes to execute a process in software or physical paper.

Some embodiments of the present disclosure provide that a local computer or server is not needed since the cloud-connected RFID trays connect to the infrastructure of the cloud application platform. Thus, in the example of multiple locations, conventional tracking systems might have a local server and/or desktop computer for managing and tracking RFID-tagged items at each location (e.g., each building). This can lead to duplicative infrastructure at each location. However, the cloud-connected RFID trays do not require a local server and/or desktop computer. Instead, the RFID trays at different locations can communicate with a cloud application platform running on cloud infrastructure. Accordingly, instead of duplicative infrastructure at each location, cloud infrastructure can be used for multiple locations. Hardware and software can be maintained or updated in the cloud instead of at each and every location that has its own local server. Further, cloud applications, for example, running in the cloud can be used to configure cloud-connected RFID trays and can be used to provide commands or instructions (e.g., executable instructions) to the cloud-connected RFID trays to perform automated processes (e.g., RFID scans, wireless transmissions, etc.). In some embodiments, applications that are not running in the cloud, but can be connected to the cloud, can be used to provide commands or instructions to the cloud-connected RFID trays to perform automated processes. The applications that are not running in the cloud (e.g., external to the cloud), but can be connected to the cloud via the Internet, for example, can be run locally with or remotely from the RFID trays.

Referring to FIG. 1, an embodiment of an RFID tray 100 is shown. The RFID tray 100 can have an upper surface 101 on which one or more RFID-tagged items can be placed. The RFID tray 100 can include, for example, a discreet embedded device having the size and shape of a common document tray or flat tabletop pad or some other shape or form that is configured to use RFID technology to report RFID-tagged items 106 with RFID tags 108 in, on, or near the RFID tray 100 to a cloud application platform. The RFID tray 100 can be configured to report RFID-tagged items based on, for example, a configurable schedule, one or more commands received from a cloud application, or the occurrence of an event such as the actuation of a physical button or the triggering of a sensor.

The RFID tray 100 can include one or more inputs 102 and one or more outputs 104. Examples of outputs 104 can include, for example, a display, lights, a speaker, etc. Examples of inputs can include, for example, a button, a touch-sensitive display, a switch, a sensor, etc. The RFID tray 100 can include, for example, circuitry that can be configured to perform one or more of the following: scan or read an RFID tag, receive RFID tag information, determine or identify tag information from RFID tag, store tag information, transmit tag information transmission to a cloud. The RFID tray 100 can include circuitry that can be configured to perform one or more of the following: receive communication from the cloud, send communication to the cloud, determine health status of the RFID tray 100, communicate the health status to the cloud, receive commands and/or executable instructions from the cloud, and perform the received commands and/or executable instructions.

In some embodiments, there are multiple commands and/or instructions that can be executed through the cloud application for optimizing or changing the performance of the RFID tray 100 including, for example, one or more of the following: changing/optimizing the RFID read sensitivity; changing/optimizing the RFID power level; changing the RFID frequency or frequency range (e.g., compliant with U.S., European, or Japanese regulations); updating network settings; setting scan order of RFID antennae; number of RFID antennas to use and which ones; etc.

In some embodiments, the RFID tray 100 can include, for example, one or more of the following: a processor, a non-transitory memory, a scanner, a reader, a sensor, one or more antennas, one or more antenna arrays, a non-transitory storage device, input/output devices, location-determining devices, and communication devices (e.g., wired or wireless transceivers). The various circuit or device components can be operatively coupled to each other by one or more buses, wires, and/or cables.

In operation according to some embodiments, one or more RFID-tagged items are placed on the upper surface 101 of the RFID tray 100. The item placement can occur during or after a healthcare procedure, a stock room procedure, a laboratory experiment, etc. according to some embodiments. In some embodiments, the RFID tray 100 can be configured to differentiate between RFID-tagged items placed on the upper surface 101 of the RFID tray and other RFID-tagged items that are not placed on the upper surface 101 (e.g., placed next to, instead on, the RFID tray 100). In some embodiments, the RFID tray 100 can be configured not to scan the RFID-tagged items that are not placed on the upper surface 101, for example, of the RFID tray 100.

In some embodiments, by sensing that the RFID-tagged item is on the upper surface 101 or by sensing that a button, for example, of the inputs 102 has been actuated, the RFID tray 100 can request a command from the cloud through its communication device via a wired or wireless link. The cloud can then send a command which can include, for example, instructions (e.g., commands, executable instructions, etc.) for the RFID tray 100 to perform particular automated processes including, for example, to perform an RFID scan and to send RFID label information to the cloud for further processing including, for example, tracking and managing inventory.

In some embodiments, by sensing that the RFID-tagged item is on the upper surface 101 or by sensing that a button, for example, of the inputs 102 has been actuated, the RFID tray 100 can perform particular automated processes including, for example, to perform an RFID scan without first sending a command request to the cloud. After performing the RFID scan, the RFID tray 100 can send RFID label information to the cloud for further processing including, for example, tracking and managing inventory.

Figure 2:
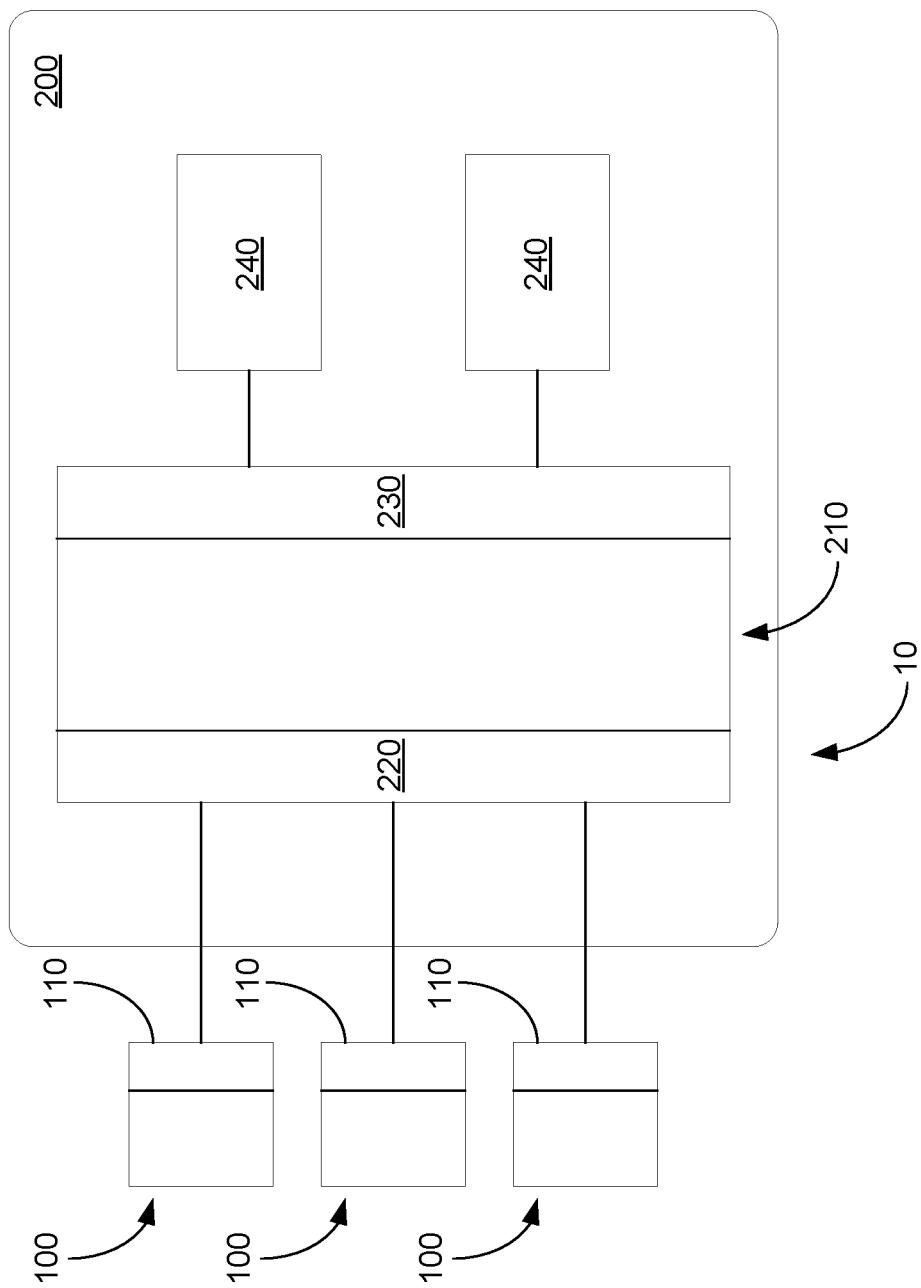
FIG. 2 shows an embodiment of an RFID tray system according to the present disclosure.

Referring to FIG. 2, an RFID tray system 10 is shown. The RFID tray system 10 includes RFID trays 110 connected to the cloud network 200. The cloud network 200 can include, for example, a cloud application platform 210 and one or more cloud applications 240. The RFID tray 100 is configured to provide an embedded agent 110. The cloud application platform 210 is configured to provide a device application programming interface (API) 220 and a cloud API 230. The RFID trays 100 and the cloud application platform 210 are configured to communicate through the embedded agents 110 and the device API 220. The cloud applications 240 and the cloud application platform 210 are configured to communicate through the cloud API 230. The cloud applications 240 and the RFID trays 210 are configured to communicate through the cloud application platform 210.

In some embodiments, applications that are not part of the cloud network 200 can be used instead of or in addition to the one or more cloud applications 240. Thus, these applications which are external to the cloud network, but which can connect (e.g., via the Internet through wireless and/or wired means) to the cloud network and, in particular, the cloud application platform 210, can perform many or all of the functions and operations of the one or more cloud applications 240. In addition, these applications can be run on platforms or environments that are local to or remote from the RFID trays 110.

In some embodiments, the cloud application platform 210 is configured to aggregate (e.g., centrally aggregate) RFID tag data and device health data from the RFID trays 100. In some embodiments, for example, the cloud applications 240 can receive RFID tag data and device health data from the cloud application platform 210 via the APIs 220, 230 to drive an automated process at the RFID trays 100.

The cloud application platform 210 and the cloud applications 240 can be configured to run on one or more cloud servers. In some embodiments, the cloud application platform 210 and/or the cloud applications 240 can include, for example, hardware, software, and/or firmware that is implemented in the one or more cloud servers. The RFID trays 210 can be configured to communicate with the one or more cloud servers through one or more routers connected to the Internet, for example. In some embodiments, the RFID trays 210 do not need a local computer or a local server to communicate with the cloud network 200.

In some embodiments, the RFID tray 100 is configured to include an RFID reader, one or more RFID antennas, an Ethernet port, a power source, a controller, and an embedded agent 110. The embedded agent 110 can include, for example, hardware, software, and/or firmware that is implemented in each RFID tray 100. The embedded agent 110 is configured to coordinate device input/output (I/O) and to communicate with the cloud application platform 210. For example, the embedded agent can be configured to receive commands such as a request for tag information from the cloud application platform 210. In some embodiments, the embedded agent 110 is configured to use cloud-friendly network protocols (e.g., WebSocket, HTTP/S, etc.) so that the device can be used with networks (e.g., unmanaged networks) to connect to the cloud application platform 210.

Figure 3:
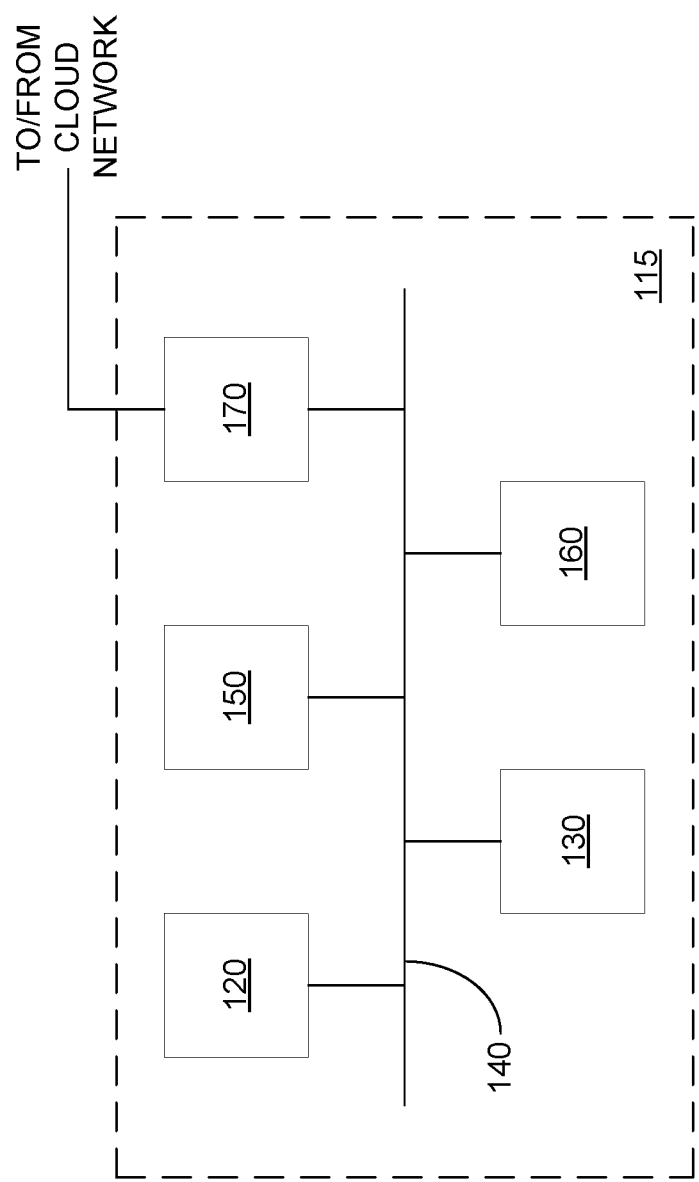
FIG. 3 shows an embodiment of some of the circuitry of the RFID tray according to the present disclosure.

FIG. 3 shows some of the circuitry 115 of the RFID tray 100. The circuitry 115 can include, for example, a controller 120, a memory 130 (e.g., a non-transitory memory), device I/O 150, an RFID reader 160, and a communication device 170. The various components of the circuitry 115 can be connected by one or more buses 140, wires, and/or cables. The circuitry 115 can be powered by one or more batteries or an electrical cable connected to a wall outlet (not shown). The circuitry 115 can also be powered by power over Ethernet (PoE). In some embodiments, the RFID reader 160 can be connected (e.g., directly or indirectly connected) to its own one or more antennas (not shown), and the communication device 170 can be connected to its own one or more antennas (not shown), for example. In some embodiments, the RFID reader 160 can include, for example, one or more antennas.

The controller 120 can include, for example, one or more of the following: a processor, a central processing unit, a central processing unit controller, a digital signal processor, a signal conditioner, a microcontroller, an encoder, a decoder, a communication processor, a graphics processor, etc. The controller 120 can also include, for example, analog-to-digital converters and/or digital-to-analog converters. In some embodiments, the embedded agent 110 is part of or in communication with the controller 120. In some embodiments, hardware, software, and/or firmware of the controller 120 is used to implement the embedded agent.

The memory 130 can include, for example, one or more of the following: non-transitory memory, computer storage, volatile memory, non-volatile memory, rand access memory (RAM), read only memory (ROM), flash memory, solid state memory, semiconductor memory, electromagnetic memory, optical memory, hard drive, memory stick, memory card, etc. In some embodiments, the memory 130 can include memory that is removable such as a memory card for transferring memory contents from the RFID tray 100, for example.

Device I/O 150 can include device inputs such as, for example, one or more of the following: buttons, a keypad, a keyboard, a track pad, a mouse, switches, a touch-sensitive display, a microphone, a sensor, etc. Device I/O 150 can also include device outputs such as, for example, one or more of the following: touch-sensitive displays, screens, lights, light emitting diodes (LEDs), liquid crystal displays (LCDs), speakers, etc.

The communication device 170 can include, for example, one or more transceivers that are configured for wired and/or wireless communication. For example, the communication device 170 can be configured to connect to a cable or wire such as an Ethernet cable, a digital subscriber line (DSL), an optical cable, etc. In some embodiments, the communication device 170 is configured to maintain a persistent connection to the cloud network 200. The communication device 170 can also be configured to connect to one or more antennas for wireless communication such as cellular communication, WiFi communication, IEEE 802.11-compliant communication, Bluetooth communication, WiMax communication, multiple-input-multiple-output (MIMO) communication, radio communication, satellite communication, etc. In some embodiments, the communication device 170 can include, for example, one or more of the following: a signal conditioner, an upconverter, a downconverter, etc. The communication device 170 can also include, for example, a GPS receiver or another type of location-determining transceiver.

In operation according to some embodiments, a button or some other input device of the device inputs 150 of the RFID tray 100 is actuated. In some embodiments, the RFID tray 100 can sense through a sensor (e.g., a light sensor, a proximity sensor, a weight sensor, accelerometer, etc.) when an RFID-tagged item or items has been placed on or in the RFID tray 100. In response to the button being depressed, for example, or in response to sensing that an RFID-tagged item or items has been placed on the upper surface 101 of the RFID tray, for example, the embedded agent 110 can request a command from one or more of the cloud applications 240 through the cloud application platform 210 and the APIs 220, 230. Additional security measures might be required before a request is sent such as through a pass reader or a biometric sensor. In response to the request, the cloud application 240 can then send a command to embedded agent 110 to perform particular automated processes. In some embodiments, the command can include executable instructions and/or parameters.

In some embodiments, the particular automated processes can include, for example, that the RFID reader 160 perform an RFID scan of an RFID-tagged item or items on or in the RFID tray 100. In some embodiments, the RFID reader 160 can perform the RFID scan using one or more of its own antennas or one or more antennas (e.g., one or more dedicated antennas) to which it is connected. The embedded agent 110 determines the tag information and stores the tag information in the memory 130. When the scan is complete, the embedded agent 110 readies the stored tag information for transport and transmits the tag information to the cloud network through the communication device 170. In some embodiments, the transmitted tag information travels to a router that is connected to the Internet. The information is received by cloud application platform 210 via the device API 220. The information can then be pushed to or pulled by the cloud application 240 from the cloud application platform 210 through the cloud API 230. The cloud application 240 can then track and/or manage inventory. If additional items of inventory are required at a particular location or in a particular stock room because the stock has gone below a particular threshold, the cloud application 240 can then request the re-supply from a central stock room or the re-ordering from a vendor.

In some embodiments, the cloud application 240 can, without receiving a request form the RFID tray 100, issue a command to the RFID tray 100 to perform an RFID scan and receive the results of the scan as a synchronous process or an asynchronous process (e.g., command driven process, event driven process, condition driven process, etc.).

In some embodiments, the depressing of a button or the sensing of an RFID-tagged item or items causes the embedded agent 110 to perform the particular automated processes, without first sending a request to the cloud application 240. The embedded agent 110 then performs the scan and sends the tag information to the cloud application 240 after the scan.

In some embodiments, the depressing of a button or the sensing of an RFID-tagged item or items causes the embedded agent 110 to perform the scan and to store the tag information without sending the information to the cloud application 240. The embedded agent 110 then waits for the cloud application 240 to request the aggregated tag information from multiple scans. In some embodiments, the cloud application 240 can periodically request all of the tag information since the previous request. In some embodiments, the cloud application 240 can request tag information based on a schedule (e.g., a configurable schedule). In some embodiments, the embedded agent 110 can periodically, or according to a schedule, send out tag information to the cloud application 240 without receiving a request or command from the cloud application 240.

In some embodiments, the embedded agent 110 can monitor the health status of the RFID tray 100. For example, the embedded agent 110 can monitor whether the various components and circuitry of the RFID tray 100 are working properly. The embedded agent 110 can also monitor the status of certain events (e.g., the persistent connection to the cloud network 200), the power (e.g., battery charge, whether the electrical cord is connected to the wall outlet) of the RFID tray 100, the status of particular sensors (e.g., the temperature sensor that provides a temperature indication of the RFID tray 100 or the circuitry 115, for example), and RFID tray 100 location information. The embedded agent 110 can provide status information through various output devices 150 such as displays, lights (e.g., LEDs), and sounds. The status information can be sent by the embedded agent 110 on its own to the cloud application 240 or sent in view of a received command from the cloud application 240.

In some embodiments, the embedded agent 110 can be used to configure the cloud application 240. In some embodiments, the cloud application 240 can be used to configure the embedded agent 110 and/or the RFID tray 100. For example, as a part of a status report from the embedded agent 110, the cloud application 240 can determine that the software and/or firmware is outdated (e.g., an older version). The cloud application 240 can then configure the embedded agent 110 and/or the RFID tray 100 by updating the software and/or firmware to the most up-to-date versions.

The present method and/or system can be realized in hardware, software, or a combination of hardware and software. The present methods and/or systems can be realized in a centralized fashion in at least one computing system, or in a distributed fashion where different elements are spread across several interconnected computing systems. Any kind of computing system or other apparatus adapted for carrying out the methods described herein is suited. A typical combination of hardware and software can be a general-purpose computing system with a program or other code that, when being loaded and executed, controls the computing system such that it carries out the methods described herein. Another typical implementation can include an application specific integrated circuit or chip. Some implementations can include a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes can be made and equivalents can be substituted without departing from the scope of the present method and/or system. In addition, many modifications can be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A radio frequency identification (RFID) tray system, comprising.
   an RFID tray; and
   a cloud network operatively coupled to the RFID tray,
   wherein the RFID tray is configured to perform an RFID scan of one or more RFID-tagged items placed on or in the RFID tray, and to send tag information to a cloud application of the cloud network that tracks and manages an inventory of the RFID-tagged items.

\* \* \* \* \*